(12) United States Patent
Harrington

(10) Patent No.: US 10,093,231 B1
(45) Date of Patent: Oct. 9, 2018

(54) DRIVER ALERT SAFETY GLOVES

(71) Applicant: Joe L. Harrington, Durham, NC (US)

(72) Inventor: Joe L. Harrington, Durham, NC (US)

( * ) Notice: Subject to any disclaimer, the term of this patent is extended or adjusted under 35 U.S.C. 154(b) by 0 days.

(21) Appl. No.: 15/912,896

(22) Filed: Mar. 6, 2018

(51) Int. Cl.
| | |
|---|---|
| *G08B 23/00* | (2006.01) |
| *B60Q 9/00* | (2006.01) |
| *A41D 1/00* | (2018.01) |
| *A41D 19/00* | (2006.01) |

(52) U.S. Cl.
CPC ............... *B60Q 9/00* (2013.01); *A41D 1/005* (2013.01); *A41D 19/0003* (2013.01); *A41D 19/0024* (2013.01); *A41D 2400/00* (2013.01)

(58) Field of Classification Search
CPC ........ A61B 5/18; A61B 5/4812; A61B 5/7455
USPC .............................................. 340/573.1–576
See application file for complete search history.

(56) References Cited

U.S. PATENT DOCUMENTS

| | | | |
|---|---|---|---|
| 3,861,349 A | 1/1975 | Conley | |
| 3,964,045 A | 6/1976 | Conley | |
| 4,059,830 A * | 11/1977 | Threadgill | B60K 28/06 |
| | | | 200/DIG. 2 |
| 4,361,834 A | 11/1982 | King | |
| 5,585,785 A | 12/1996 | Gwin | |
| 5,969,616 A | 10/1999 | Tschoi | |
| 6,016,103 A * | 1/2000 | Leavitt | G08B 21/06 |
| | | | 340/575 |
| 7,830,265 B2 | 11/2010 | Power | |
| D774,723 S | 12/2016 | Daniel | |
| 2003/0141978 A1 | 7/2003 | D'Agosto | |

FOREIGN PATENT DOCUMENTS

GB          2171547          2/1988

* cited by examiner

*Primary Examiner* — Emily C Terrell
*Assistant Examiner* — Sharmin Akhter
(74) *Attorney, Agent, or Firm* — Kyle A. Fletcher, Esq.

(57) ABSTRACT

The driver alert safety glove comprises a glove with a battery-operated drowsiness alarm coupled to the back of the glove. The drowsiness alarm comprises a control circuit, a first magnetized contact, a second magnetized contact, and a sound transducer in a housing on the back of the glove. The magnetized contacts are coupled to the material on the back of the glove such that when the driver's hand is attentively gripping the steering wheel the back of the glove is stretched and pulls on the magnetized contacts, causing them to separate. If the drive gets drowsy and relaxes their grip, the magnetic properties of the magnetized contacts draw them together and the contacts complete an electrical circuit. Completion of the electrical circuit causes the control circuit to emit an audible sound via the sound transducer to alert the driver.

16 Claims, 3 Drawing Sheets

DRIVER ALERT SAFETY GLOVES

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of driving accessories and vehicular safety devices, more specifically, a driver alert safety glove.

SUMMARY OF INVENTION

The driver alert safety glove comprises a glove with a battery-operated drowsiness alarm coupled to the back of the glove. The drowsiness alarm comprises a control circuit, a first magnetized contact, a second magnetized contact, and a sound transducer in a housing on the back of the glove. The magnetized contacts are coupled to the material on the back of the glove such that when the driver's hand is attentively gripping the steering wheel the back of the glove is stretched and pulls on the magnetized contacts, causing them to separate. If the drive gets drowsy and relaxes their grip, the magnetic properties of the magnetized contacts draw them together and the contacts complete an electrical circuit. Completion of the electrical circuit causes the control circuit to emit an audible sound via the sound transducer to alert the driver.

An object of the invention is to provide a glove that alerts a drowsy driver.

Another object of the invention is to detect that a driver is becoming drowsy by using two magnetized contacts to sense a change in the driver's grip.

A further object of the invention is to alert the driver using an audible sound.

Yet another object of the invention is to provide a mechanism for resetting an activated alert.

These together with additional objects, features and advantages of the driver alert safety glove will be readily apparent to those of ordinary skill in the art upon reading the following detailed description of the presently preferred, but nonetheless illustrative, embodiments when taken in conjunction with the accompanying drawings.

In this respect, before explaining the current embodiments of the driver alert safety glove in detail, it is to be understood that the driver alert safety glove is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the driver alert safety glove.

It is therefore important that the claims be regarded as including such equivalent construction insofar as they do not depart from the spirit and scope of the driver alert safety glove. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
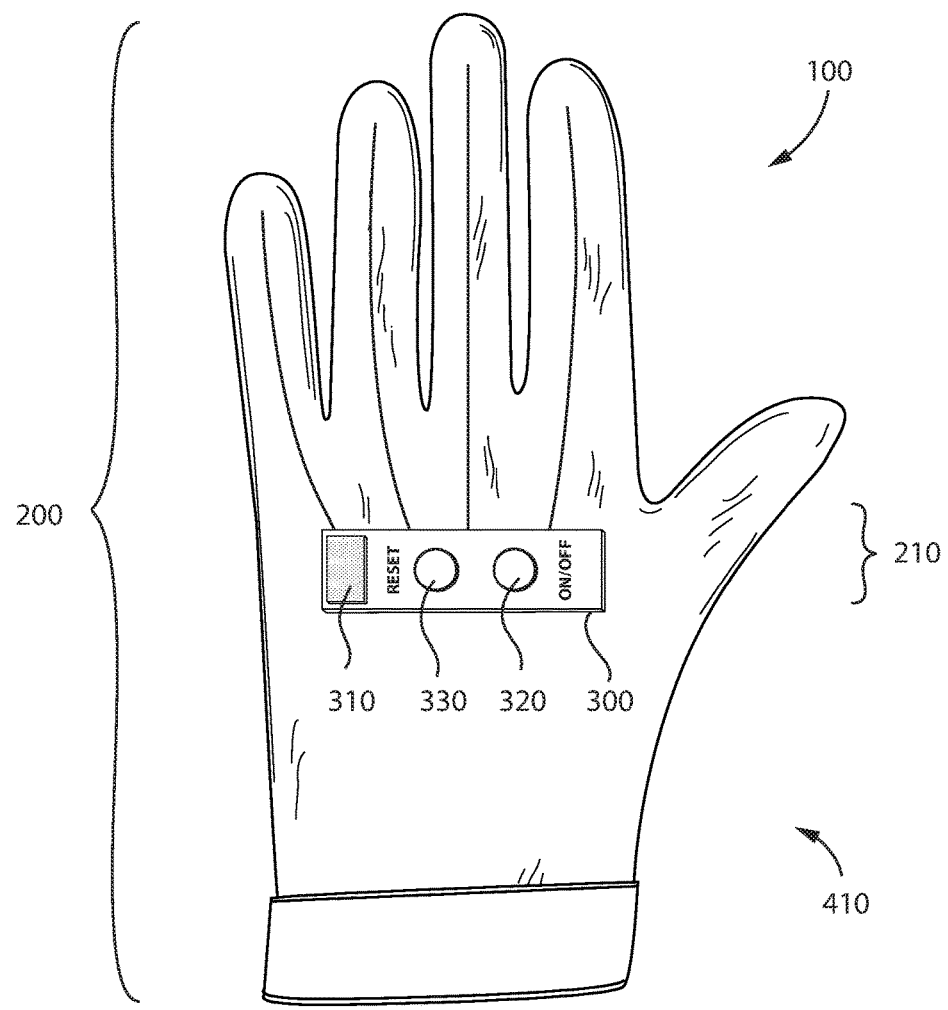
FIG. 1 is a top view of an embodiment of the disclosure.
Figure 2:
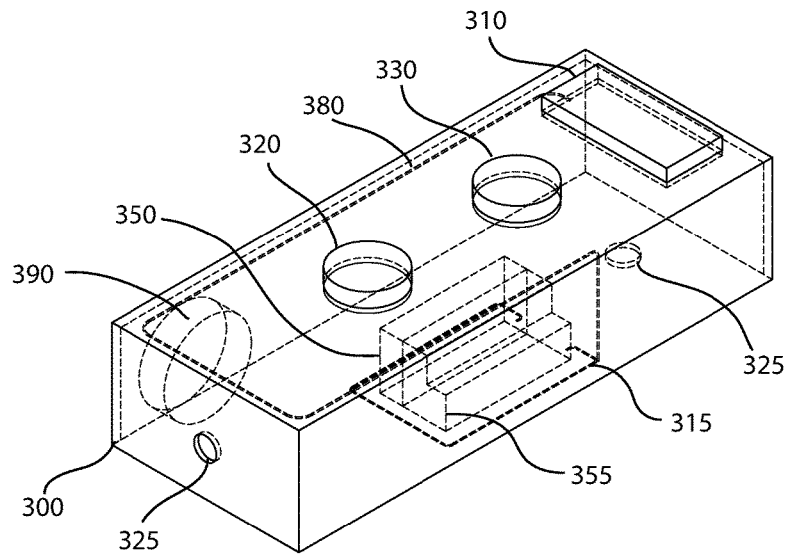
FIG. 2 is an exploded view of an embodiment of the disclosure illustrating the magnetic contacts touching each other.
Figure 3:
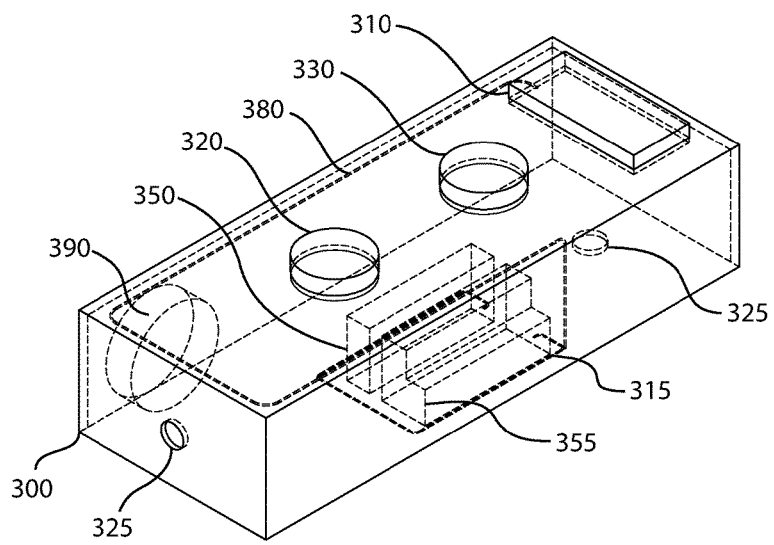
FIG. 3 is an exploded view of an embodiment of the disclosure illustrating the magnetic contacts separated from each other.
Figure 4:
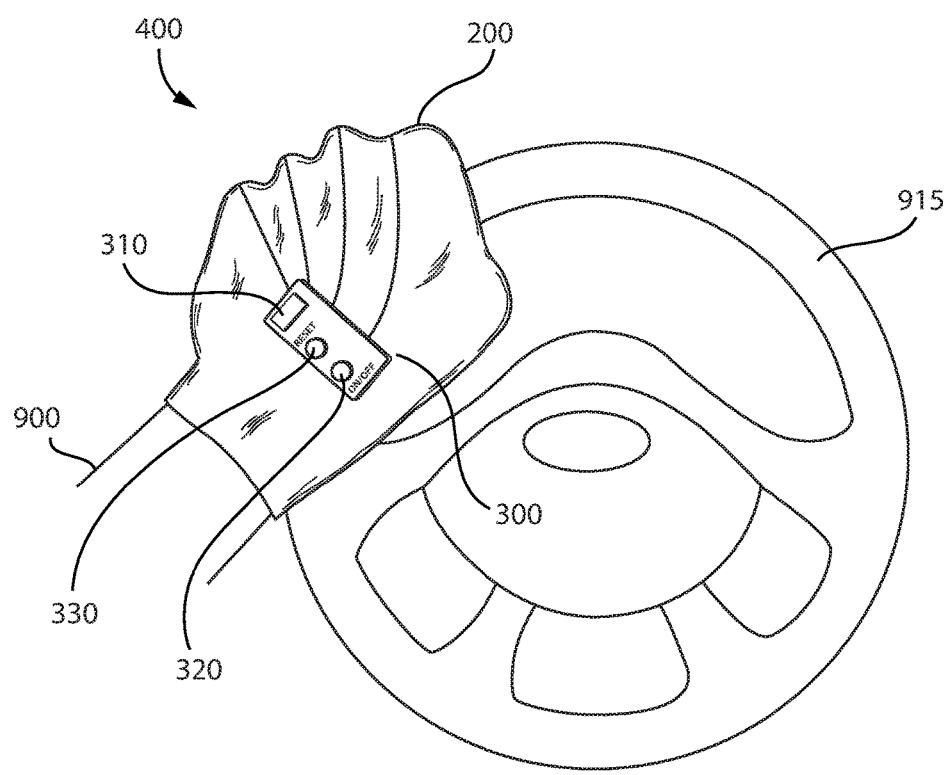
FIG. 4 is an in-use view of an embodiment of the disclosure.

Detailed reference will now be made to a first potential embodiment of the disclosure, which is illustrated in FIGS. 1 through 4.

The driver alert safety glove 100 (hereinafter invention) comprises a glove 200 and a drowsiness alarm 210. The invention 100 may be adapted to be worn by a driver 900 of a vehicle (not illustrated in the figures). The invention 100 may be adapted to emit an audible sound intended to startle the driver 900, responsive to detecting a relaxed grip 410 on a steering wheel 915.

The glove 200 may be a garment that is adapted to cover a hand of the driver 900. The glove 200 may cover a right hand or a left hand. The glove 200 may be made from natural materials, synthetic materials, or a combination thereof. As non-limiting examples, the glove 200 may be made from leather or nylon. The drowsiness alarm 210 may be coupled to the glove 200 over the back of the hand.

The drowsiness alarm 210 comprises a housing 300, a sound transducer 310, a first magnetized contact 350, a second magnetized contact 355, a control circuit 380, an on/off control 320, a reset control 330, and a battery 390.

The housing 300 may be an enclosure for the control circuit 380, the sound transducer 310, the first magnetized contact 350, the second magnetized contact 355, the reset control 330, the on/off control 320, and the battery 390. The housing 300 couples to the glove 200 in such a way that the back of the glove 200 is free to stretch underneath the housing 300. As non-limiting examples, the bottom of the housing 300 may be sewn, glued, riveted, or otherwise attached to the glove 200 on two opposing corners or edges. By way of example and not of limitation, see one or more rivet apertures 325 in FIG. 2 and FIG. 3.

In some embodiments, the bottom of the housing 300 may comprise a bottom aperture 315. The bottom aperture 315 may be an opening on the bottom of the housing 300 to allow the first magnetized contact 350 and the second magnetized contact 355 to couple to the back of the glove 200 while maintaining electrical connections to the control circuit 380. The first magnetized contact 350 and the second magnetized contact 355 may electrically connect to the control circuit 380 using wiring 360 that is not illustrated in the figures.

In some embodiments, the housing 300 may be internally divided into compartments such that the control circuit 380 may occupy a first compartment (not illustrated in the figures) and the first magnetized contact 350 and the second magnetized contact 355 may occupy a second compartment (not illustrated in the figures). The second compartment may be at least partially open to allow the first magnetized contact 350 and the second magnetized contact 355 to couple to the back of the glove 200.

In some embodiments, the orientation of the housing 300 may be perpendicular to the longitudinal axis of the hand with a material of the glove 200 free to move in the direction of the longitudinal axis of the hand under the glove 200.

The sound transducer 310 may be a device that converts an electrical signal into the audible sound. As non-limiting examples, the sound transducer 310 may be a loudspeaker or a piezoelectric transducer. The electrical signal may be modulated by the control circuit 380.

The first magnetized contact 350 may be an electrical device that is both electrically conductive and magnetic. A bottom surface of the first magnetized contact 350 may be coupled to the back of the glove 200. A side surface of the first magnetized contact 350 may be adjacent to the second magnetized contact 355. The magnetized portion of the first magnetized contact 350 may include the entire contact, an entire side surface of the contact, or a subset thereof. The electrically conductive portion of the first magnetized contact 350 may include the entire contact, an entire side surface of the contact, or a subset thereof.

The second magnetized contact 355 may be an electrical device that is both electrically conductive and magnetic. A bottom surface of the second magnetized contact 355 may be coupled to the back of the glove 200. A side surface of the second magnetized contact 355 may be adjacent to the first magnetized contact 350. The magnetized portion of the second magnetized contact 355 may include the entire contact, an entire side surface of the contact, or a subset thereof. The electrically conductive portion of the second magnetized contact 355 may include the entire contact, an entire side surface of the contact, or a subset thereof.

The first magnetized contact 350 and the second magnetized contact 355 may be arranged on the back of the glove 200 such that when the material of the glove 200 is relaxed, the magnetic attraction between the first magnetized contact 350 to the second magnetized contact 355 may pull the first magnetized contact 350 and the second magnetized contact 355 together. When pulled together, the electrically conductive portion of the first magnetized contact 350 and the electrically conductive portion of the second magnetized contact 355 may touch each other and may complete a sensing circuit (not illustrated in the figures).

When the glove 200 is stretched, the material on the back of the glove 200 may pull the second magnetized contact 355 away from the first magnetized contact 350, breaking the sensing circuit.

The strength of the magnets within the first magnetized contact 350 and the second magnetized contact 355 must be weak enough such that the force from tension on the material of the glove 200 may overcome the magnetic attraction and separate the first magnetized contact 350 and the second magnetized contact 355.

The control circuit 380 may monitor the sensing circuit that passes through the first magnetized contact 350 and the second magnetized contact 355 and may determine when to activate the sound transducer 310 based upon the status of the sensing circuit.

When the first magnetized contact 350 and the second magnetized contact 355 are held apart by stretching of the material due to an attentive grip 400 of the steering wheel 915 and the sensing circuit is broken, the control circuit 380 may refrain from activating the sound transducer 310. The attentive grip 400 may be a grip where the fingers are wrapped around the steering wheel 915, stretching the back of the hand.

When the first magnetized contact 350 and the second magnetized contact 355 are touching due to the relaxed grip 410 and the sensing circuit is intact, the control circuit 380 may activate the sound transducer 310 and emit the audible sound. The relaxed grip 410 may be a grip where the fingers are straightened and the back of the hand is not stretched. The relaxed grip 410 may be an indication that the driver 900 is drowsy. The audible sound may alert the driver 900 and cause them to pull over and rest.

In some embodiments, the control circuit 380 may continue to activate the sound transducer 310 and emit the audible sound until the reset control 330 is activated.

In some embodiments, the control circuit 380 may continue to activate the sound transducer 310 and emit the audible sound until the attentive grip 400 is re-established and the first magnetized contact 350 is separated from the second magnetized contact 355.

In some embodiments, once it has been activated, the control circuit 380 may continue to activate the sound transducer 310 and emit the audible sound for a first pre-determined time interval regardless of the state of the sensing circuit.

In some embodiments, the control circuit 380 may not activate the sound transducer 310 unless the first magnetized contact 350 and the second magnetized contact 355 touch each other for at least a second pre-determined time interval. This may provide time for the driver 900 to establish the attentive grip 400 after turning the drowsiness alarm 210 on and may allow the driver 900 to adjust their hand position from time to time without activating the sound transducer 310.

The control circuit 380 may be enabled by activating the on/off control 320 when the control circuit 380 is disabled. The control circuit 380 may be disabled by activating the on/off control 320 when the control circuit 380 is enabled. When disabled, the control circuit 380 may consume a reduced amount of power compared to when enabled.

The battery 390 may comprise one or more energy-storage devices. The battery 390 may be a source of electrical energy to operate the control circuit 380. The battery 390 may be replaceable or rechargeable.

In use, the driver 900 may don the glove 200 and may activate the on/off control 320 to enable the control circuit 380. The driver 900 may then grasp the steering wheel 915 using the attentive grip 400 causing the first magnetized contact 350 and the second magnetized contact 355 to separate and the sound transducer 310 will be silent. If the driver 900 becomes drowsy and positioning of the hand changes to the relaxed grip 410, the first magnetized contact 350 and the second magnetized contact 355 may touch and the control circuit 380 may cause the sound transducer 310 to emit the audible sound, waking the driver 900. Now aware of the fact that they have been alerted from a drowsy state, the driver 900 may safely exit the roadway, park the vehicle, and rest.

As used in this disclosure, an "aperture" is an opening in a surface. Aperture may be synonymous with hole, slit, crack, gap, slot, or opening.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw.

As used herein, the words "couple", "couples", "coupled" or "coupling", refer to connecting, either directly or indirectly, and does not necessarily imply a mechanical connection.

As used in this disclosure, a "glove" is an item of apparel that covers a hand. The glove comprises five finger stalls into which the fingers of the hand are inserted. A glove is further defined with a palm side and a back side. The palm side is proximal to the palm of the hand. The back side is distal from the palm side.

As used in this disclosure, a "housing" is a rigid casing that encloses and protects one or more devices.

As used herein, the word "longitudinal" or "longitudinally" refers to a lengthwise or longest direction.

As used in this disclosure, "orientation" refers to the positioning and/or angular alignment of a first object relative to a second object or relative to a reference position or reference direction.

As used in this disclosure, a "transducer" is a device that converts a physical quantity, such as pressure or brightness into an electrical signal or a device that converts an electrical signal into a physical quantity.

As used in this disclosure, a "vehicle" is a device that is used for transporting passengers, goods, or equipment.

Throughout this document references to "wire", "wires", "wired", or "wiring" may describe and/or show a single conductor when, in fact, two conductors may be required to power or control a subsystem; a convention used herein is to not show the common return conductor to which all electrical subsystems are connected—this common return conductor is a continuous electrical path and does not pass through any type of switch or other electrical component other than the possibility of passing through one or more connectors.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:
1. A driver alert safety glove comprising:
a glove and a drowsiness alarm;
wherein the driver alert safety glove is adapted to be worn by a driver of a vehicle;
wherein the driver alert safety glove emits an audible sound, responsive to detecting a relaxed grip on a steering wheel;
wherein the glove is a garment that is adapted to cover a hand of the driver;
wherein the glove is adapted to cover a right hand or a left hand; wherein the drowsiness alarm is coupled to the glove over the back of the hand;
wherein the drowsiness alarm comprises a housing, a sound transducer, a first magnetized contact, a second magnetized contact, a control circuit, an on/off control, a reset control, and a battery; wherein the housing is an enclosure for the control circuit, the sound transducer, the first magnetized contact, the second magnetized contact, the reset control, the on/off control, and the battery;
wherein the housing couples to the glove in such a way that the back of the glove is free to stretch underneath the housing;
wherein the bottom of the housing comprises a bottom aperture;
wherein the bottom aperture is an opening on the bottom of the housing to allow the first magnetized contact and the second magnetized contact to couple to the back of the glove while maintaining electrical connections to the control circuit.

2. The driver alert safety glove according to claim 1
wherein the housing is internally divided into compartments such that the control circuit occupies a first compartment and the first magnetized contact and the second magnetized contact occupy a second compartment;
wherein the second compartment is at least partially open to allow the first magnetized contact and the second magnetized contact to couple to the back of the glove.

3. The driver alert safety glove according to claim 1
wherein the orientation of the housing is perpendicular to the longitudinal axis of the hand with a material of the glove free to move in the direction of the longitudinal axis of the hand under the glove.

4. The driver alert safety glove according to claim 3
wherein the sound transducer is a device that converts an electrical signal into the audible sound.

5. The driver alert safety glove according to claim 4
wherein the first magnetized contact is an electrical device that is both electrically conductive and magnetic;
wherein a bottom surface of the first magnetized contact is coupled to the back of the glove;
wherein a side surface of the first magnetized contact is adjacent to the second magnetized contact;
wherein the magnetized portion of the first magnetized contact includes the entire contact, an entire side surface of the contact, or a subset thereof;
wherein the electrically conductive portion of the first magnetized contact includes the entire contact, an entire side surface of the contact, or a subset thereof.

6. The driver alert safety glove according to claim 5
wherein the second magnetized contact is an electrical device that is both electrically conductive and magnetic;
wherein a bottom surface of the second magnetized contact is coupled to the back of the glove;
wherein a side surface of the second magnetized contact is adjacent to the first magnetized contact;
wherein the magnetized portion of the second magnetized contact includes the entire contact, an entire side surface of the contact, or a subset thereof;
wherein the electrically conductive portion of the second magnetized contact includes the entire contact, an entire side surface of the contact, or a subset thereof.

7. The driver alert safety glove according to claim 6
wherein the first magnetized contact and the second magnetized contact are arranged on the back of the glove such that when the material of the glove is relaxed, the magnetic attraction between the first magnetized contact to the second magnetized contact pulls the first magnetized contact and the second magnetized contact together;
wherein when pulled together, the electrically conductive portion of the first magnetized contact and the electrically conductive portion of the second magnetized contact touch each other and complete a sensing circuit.

8. The driver alert safety glove according to claim 7
wherein when the glove is stretched, the material on the back of the glove pulls the second magnetized contact away from the first magnetized contact, breaking the sensing circuit.

9. The driver alert safety glove according to claim 8
wherein the strength of the magnets within the first magnetized contact and the second magnetized contact are weak enough such that the force from tension on the material of the glove overcomes the magnetic attraction and separates the first magnetized contact and the second magnetized contact.

10. The driver alert safety glove according to claim 9
wherein the control circuit monitors the sensing circuit that passes through the first magnetized contact and the second magnetized contact and determines when to activate the sound transducer based upon the status of the sensing circuit.

11. The driver alert safety glove according to claim 10
wherein when the first magnetized contact and the second magnetized contact are held apart by stretching of the material due to an attentive grip of the steering wheel and the sensing circuit is broken, the control circuit refrains from activating the sound transducer;
wherein the attentive grip is a grip where the fingers are wrapped around the steering wheel, stretching the back of the hand;
wherein when the first magnetized contact and the second magnetized contact are touching due to the relaxed grip and the sensing circuit is intact, the control circuit activates the sound transducer and emit the audible sound;
wherein the relaxed grip is a grip where the fingers are straightened and the back of the hand is not stretched.

12. The driver alert safety glove according to claim 11
wherein the control circuit continues to activate the sound transducer and emit the audible sound until the reset control is activated.

13. The driver alert safety glove according to claim 12
wherein the control circuit continues to activate the sound transducer and emit the audible sound until the attentive grip is re-established and the first magnetized contact is separated from the second magnetized contact.

14. The driver alert safety glove according to claim 12
wherein once it has been activated the control circuit continues to activate the sound transducer and emit the audible sound for a first pre-determined time interval regardless of the state of the sensing circuit.

15. The driver alert safety glove according to claim 12
wherein the control circuit does not activate the sound transducer unless the first magnetized contact and the second magnetized contact touch each other for at least a second pre-determined time interval.

16. The driver alert safety glove according to claim 12
wherein the control circuit is enabled by activating the on/off control when the control circuit is disabled;
wherein the control circuit is disabled by activating the on/off control when the control circuit is enabled;
wherein when disabled, the control circuit consumes a reduced amount of power compared to when enabled;
wherein the battery comprises one or more energy-storage devices;
wherein the battery is a source of electrical energy to operate the control circuit;
wherein the battery is replaceable or rechargeable.

* * * * *